(12) United States Patent
Mishra et al.

(10) Patent No.: US 10,138,789 B1
(45) Date of Patent: Nov. 27, 2018

(54) EXHAUST GAS TREATMENT SYSTEMS UTILIZING A PLURALITY OF REDUCED-RESISTANCE MIXERS

(71) Applicant: GM GLOBAL TECHNOLOGY OPERATIONS LLC, Detroit, MI (US)

(72) Inventors: Prashant Kumar Mishra, Bengaluru (IN); Asif Iqbal Siddiqui, Bengaluru (IN); Anil Yadav, Bengaluru (IN); Rahul Mital, Rochester Hills, MI (US)

(*) Notice: Subject to any disclaimer, the term of this patent is extended or adjusted under 35 U.S.C. 154(b) by 24 days.

(21) Appl. No.: 15/652,703

(22) Filed: Jul. 18, 2017

(51) Int. Cl.
*F01N 3/00* (2006.01)
*F01N 3/28* (2006.01)
*F01N 3/20* (2006.01)

(52) U.S. Cl.
CPC ......... *F01N 3/2892* (2013.01); *F01N 3/2066* (2013.01); *F01N 2610/1453* (2013.01)

(58) Field of Classification Search
USPC ......... 60/274, 286, 295, 297, 301, 303, 310, 60/317, 319, 324
See application file for complete search history.

(56) References Cited

U.S. PATENT DOCUMENTS

| | | | | |
|---|---|---|---|---|
| 8,572,949 B2* | 11/2013 | Wirth | ...................... | B01F 3/022 60/286 |
| 8,935,918 B2* | 1/2015 | Vosz | ...................... | F01N 3/2892 60/295 |
| 9,718,037 B2* | 8/2017 | Harmon | ................. | B01F 5/0473 |
| 9,909,412 B2* | 3/2018 | Kostov | ................... | G01V 1/20 |
| 2014/0033686 A1* | 2/2014 | Fischer | ............... | B01F 3/04049 60/286 |
| 2016/0237870 A1* | 8/2016 | Yokoyama | ............ | F01N 3/2066 |

\* cited by examiner

*Primary Examiner* — Binh Q Tran (57) ABSTRACT

An exhaust gas treatment system includes a selective catalytic reduction device (SCR); a reductant injector upstream from the SCR and configured to communicate reductant into the SCR via a conduit defined by an outer periphery, a first mixer disposed within the conduit upstream from the reductant injector, and a second mixer disposed within the conduit downstream from the reductant injector and upstream from the SCR. Each of the first mixer and the second mixer comprises a plurality of blades extending between a center region of the conduit to the conduit periphery, wherein each of the blades at least partially obstructs fluid flow through the conduit and are angled relative to a cross sectional plane of the conduit such that fluid flow is permitted between adjacent blades, and the plurality of blades form a turbulence plane defined by a plane angle measured from the two outermost blades of the turbulence plane.

20 Claims, 4 Drawing Sheets

EXHAUST GAS TREATMENT SYSTEMS UTILIZING A PLURALITY OF REDUCED-RESISTANCE MIXERS

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons, oxides of nitrogen ($NO_x$), and oxides of sulfur ($SO_x$), as well as condensed phase materials (liquids and solids) that constitute particulate matter. Liquids can include water and hydrocarbons, for example.

One type of exhaust treatment technology for reducing $NO_x$ emissions is a selective catalytic reduction device (SCR), which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR. The ammonia then reduces the $NO_x$ to nitrogen and water in the presence of the SCR catalyst. Ensuring suitable dispersion and decomposition of reductant within exhaust gas remains a challenge. Mixers can be employed to more effectively disperse reductant, but the same increase overall system backpressure to the detriment of many appurtenant components such as ICEs, turbochargers, and other exhaust gas treatment devices.

SUMMARY

Provided is an exhaust gas treatment system including an ICE configured to communicate exhaust gas to a selective catalytic reduction device (SCR) via a conduit defined by an outer periphery, a reductant injector configured to communicate reductant into the conduit upstream from the SCR, a first mixer disposed within the conduit upstream from the reductant injector, wherein the first mixer can include a plurality of first blades extending between a center region of the conduit to the conduit periphery, wherein each of the first blades at least partially obstructs fluid flow through the conduit and are angled relative to a cross sectional plane of the conduit such that fluid flow is permitted between adjacent first blades, and the plurality of first blades form a first turbulence plane defined by a first plane angle measured from the two outermost first blades of the first turbulence plane, and a second mixer disposed within the conduit downstream from the reductant injector and upstream from the SCR, wherein the second mixer includes a plurality of second blades extending between a center region of the conduit to the conduit periphery, wherein each of the second blades at least partially obstructs fluid flow through the conduit but are angled relative to a cross sectional plane of the conduit such that fluid flow is permitted between adjacent second blades, and the plurality of second blades form a second turbulence plane defined by a second plane angle measured from the two outermost second blades of the second turbulence plane. The first plane angle and the second plane angle are not collectively greater than 360 degrees. The first turbulence plane and the second turbulence plane can at least partially overlap. The first blades can be angled about 15 degrees to about 35 degrees relative to the cross sectional plane of the conduit, and the second blades can be angled about 15 degrees to about 35 degrees relative to the cross sectional plane of the conduit. The conduit can include a bend between the first mixer and the second mixer. The first turbulence plane angle can be larger than the second turbulence plane angle. The first turbulence plane angle can be about 95 degrees to about 275 degrees, and the second turbulence plane angle can be about 60 degrees to about 220 degrees.

Provided is an exhaust gas treatment system including a liquid injector configured to communicate a liquid into a conduit, wherein the conduit is defined by an outer periphery and configured to transport exhaust gas therein, a downstream mixer disposed within the conduit downstream from the liquid injector, comprising a plurality of downstream blades extending between a center region of the conduit to the conduit periphery, wherein each of the downstream blades includes an average angular width and are disposed such that a combined perceived average angular width of all downstream blades relative to the cross-sectional plane of the conduit is at most 215 degrees, and an upstream mixer disposed within the conduit upstream from the downstream mixer, and optionally upstream from the liquid injector, comprising a plurality of upstream blades extending between a center region of the conduit to the conduit periphery, wherein each of the upstream blades includes an average angular width and are disposed such that a combined perceived average angular width of all upstream blades relative to the cross-sectional plane of the conduit is at most 265 degrees. The upstream mixer and downstream mixer can cooperate to disperse liquid injected by the liquid injector within the conduit. The downstream mixer can include a downstream free-flow plane angle of at least 140 degrees, and the upstream mixer can include an upstream free-flow plane angle of at least 85 degrees. One or more of the downstream blades and/or one or more of the upstream blades can be angled relative to the cross sectional plane of the conduit. The liquid injector can be a reductant injector configured to communicate reductant to the conduit, and the reductant injector can be disposed upstream from a selective catalytic reduction device. The liquid injector can be a fuel injector configured to communicate fuel to the conduit, and the fuel injector can be disposed upstream from an oxidation catalyst device. The combined perceived average angular width of all downstream blades can be less than the combined perceived average angular width of all upstream blades. The combined perceived average angular width of all downstream blades can be about 55 degrees to about 215 degrees, and the combined perceived average angular width of all upstream blades can be about 85 degrees to about 265 degrees.

Provided is an exhaust gas treatment system including an ICE configured to communicate exhaust gas to a selective catalytic reduction device (SCR) via a conduit defined by an outer periphery, a reductant injector configured to communicate reductant into the conduit upstream from the SCR, a first mixer disposed within the conduit upstream from the SCR, the first mixer comprising three to five first blades extending from a proximal end proximate a center region of the conduit to the conduit periphery, wherein each of the first blades at least partially obstructs fluid flow through the conduit and are angled relative to a cross sectional plane of the conduit such that fluid flow is permitted between adjacent first blades, and a second mixer disposed within the conduit downstream from the first mixer and upstream from the SCR, the second mixer comprising two to four second blades extending from a proximal end proximate a center region of the conduit to the conduit periphery, wherein each of the second blades at least partially obstructs fluid flow through the conduit and are angled relative to a cross sectional plane of the conduit such that fluid flow is permitted between adjacent second blades. The first mixer can include a first free-flow plane angle of at least 85 degrees, and the second mixer can include an second free-flow plane angle of at least 140 degrees. The first blades can be angled about 15 degrees to about 35 degrees relative to the cross sectional plane of the conduit, and the second blades can be angled about 15 degrees to about 35 degrees relative to the cross sectional plane of the conduit. The first mixer further can include a central retainer attached to the proximate ends of the first blades and defining an axial flow region through the first mixer, and/or the second mixer can further include a central retainer attached to the proximate ends of the second blades and defining an axial flow region through the second mixer. The first mixer and second mixer can be static. The second free-flow plane can be larger than the first free-flow plane. The first blades and second blades have a surface area, and the total surface area of the plurality of first blades and the plurality of second blades can be less than or equal to the cross sectional area of the conduit. The first blades and the second blades can be derived from a single complete mixer.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to exhaust gas treatment systems utilizing a plurality of reduced resistance fluid mixers for enhancing the performance of various exhaust gas treatment devices. In particular, systems can utilize two mixers for enhancing the mixing of reductant upstream from a selective catalyst reduction device (SCR), or for enhancing the mixing of unburned fuel upstream from an oxidation catalyst device (OC). The systems described herein provided enhanced fluid mixing and/or exhaust gas treatment device (e.g., SCR) performance while also reducing system backpressure relative to other mixers.

Figure 1:
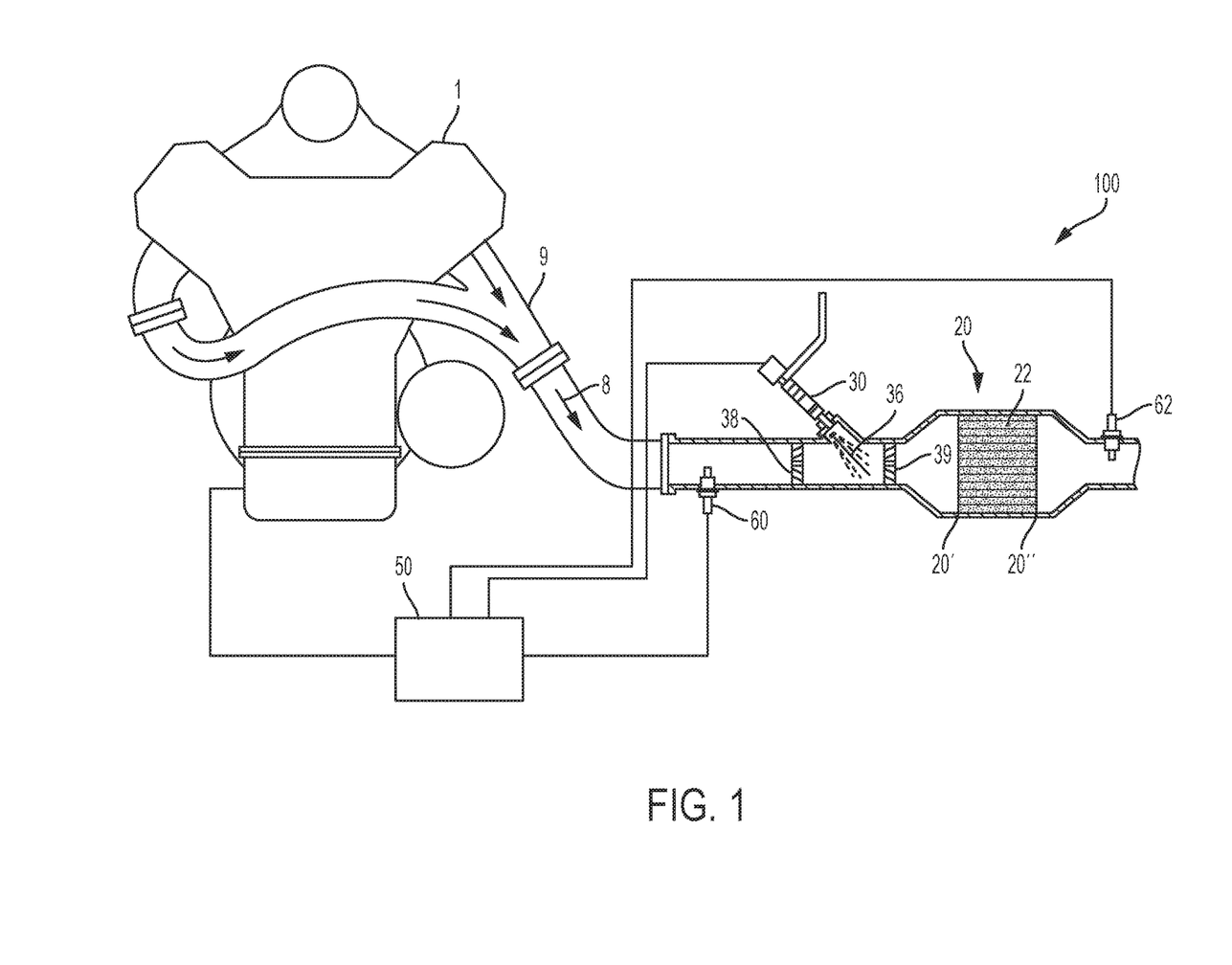
FIG. 1 illustrates an schematic view of an exhaust gas treatment system, according to one or more embodiments.

FIG. 1 illustrates an exhaust gas treatment system 100 utilizing one or more OCs for treating and/or monitoring gas species, such as species of exhaust gas 8 generated by an ICE 1. System 100 generally includes one or more exhaust gas conduits 9, and one or more downstream exhaust treatment devices. Upstream and downstream are defined in relation to the direction of the flow of exhaust gas 8 from ICE 1. As used herein, a plurality of elements described as being upstream and/or downstream from each other are necessarily in fluid communication with each other. The exhaust gas conduit 9, which can comprise several segments, transports exhaust gas 8 from the ICE 1 to the various exhaust treatment devices of the exhaust gas treatment system 100. ICE 1 is included in system 100 for the purposes of illustration only, and the disclosure herein is not to be limited to gas sources provided by ICEs. It should be further understood that the embodiments disclosed herein may be applicable to treatment of any exhaust streams including NOx, carbon monoxide (CO), HC, or other chemical species which are desirably combusted or otherwise oxidized by OCs.

As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. The methods disclosed herein are particularly suitable for use with internal combustion engine (ICE) exhaust gas treatment systems, although other application are also foreseen. Methods described herein are germane to ICE systems that can include, but are not limited to, diesel engine systems, gasoline direct injection systems, and homogeneous charge compression ignition engine systems. An ICE can include a plurality of reciprocating pistons attached to a crankshaft which may be operably attached to a driveline, such as a vehicle driveline, to power a vehicle (e.g., deliver tractive torque to the driveline). For example, an ICE can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore when reference is made to a vehicle, such disclosure should be interpreted as applicable to any application of an ICE.

ICE 1 can include one or more cylinders (not shown) capable of each accepting a piston (not shown) which can reciprocate therein. Air and fuel are combusted in the one or more cylinders thereby reciprocating the appurtenant pistons therein. The pistons can be attached to a crankshaft (not shown) operably attached to a vehicle driveline (not shown) in order to deliver tractive torque thereto, for example. Exhaust gas 8 can generally include: CO, HC, water, and oxides of nitrogen ($NO_x$). Constituents of exhaust gas, as used herein, are not limited to gaseous species. HC refers to combustable chemical species comprising hydrogen and carbon, and generally includes one or more chemical species of gasoline, diesel fuel, or the like. Exhaust gas 8 is expelled from ICE 1 and sequentially communicated to OC 10, and SCR 20. A reductant injector 30 is configured to inject reductant 36 into exhaust gas conduit 9 upstream from SCR 20. Exhaust gas 8 is can be expelled from system 100 via a vehicle tailpipe, for example.

System 100 can further include a control module 50 operably connected via a number of sensors to monitor ICE 1 and/or the exhaust gas treatment system 100. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can be operably connected to ICE 1, SCR 20, and/or one or more sensors. As shown, control module 50 is in communication with an upstream $NO_x$ sensor 60, disposed upstream from SCR 20, and a downstream $NO_x$ sensor 62, disposed downstream of SCR 20. Upstream NOx sensor 60 and downstream NOx sensor 62 can be in fluid communication with exhaust gas conduit 9 in order to extract exhaust gas 8 samples, for example.

In general, the SCR 20 includes all devices which utilize a reductant 36 and a catalyst to reduce NOx species to desired chemical species, including diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$) which is capable of decomposing into $NH_3$. Additionally or alternatively, reductant 36 can be any compound capable of decomposing or reacting in the presence of exhaust gas 8 and/or heat to form ammonia. The reductant 36 can be diluted with water in various implementations. In implementations where the reductant 36 is diluted with water, heat (e.g., from the exhaust) evaporates the water, and ammonia is supplied to the SCR 20. Non-ammonia reductants can be used as a full or partial alternative to ammonia as desired. In implementations where the reductant 36 includes urea, the urea reacts with hot exhaust gas 8 to produce ammonia, and ammonia is supplied to the SCR 20. Equation (1) below provides an exemplary chemical reaction of ammonia production via urea decomposition.

$$CO(NH_2)_2 + H_2O \rightarrow 2NH_3 + CO_2 \quad (1)$$

It should be appreciated that Equation (1) is merely illustrative, and is not meant to confine the urea or other reductant 36 decomposition to a particular single mechanism, nor preclude the operation of other mechanisms. Efficient decomposition urea to $NH_3$ typically requires temperatures in excess of about 200° C., and, depending on the amount of urea injected, for example relative to a flow rate of exhaust gas 8, urea can crystallize in temperatures less than about 200° C. Accordingly, reductant 36 injection events and/or dosing quantities are typically determined based upon system temperature and exhaust gas 8 flow rate, among others, such that urea decomposition yield is maximized and urea crystallization is minimized.

Equations (2)-(6) provide exemplary chemical reactions for $NO_x$ reduction involving ammonia.

$$6NO + 4NH_3 \rightarrow 5N_2 + 6H_2O \quad (2)$$

$$4NO + 4NH_3 + O_2 \rightarrow 4N_2 + 6H_2O \quad (3)$$

$$6NO_2 + 8NH_3 \rightarrow 7N_2 + 12H_2O \quad (4)$$

$$2NO_2 + 4NH_3 + O_2 \rightarrow 3N_2 + 6H_2O \quad (5)$$

$$NO + NO_2 + 2NH_3 \rightarrow 2N_2 + 3H_2O \quad (6)$$

It should be appreciated that Equations (2)-(6) are merely illustrative, and are not meant to confine SCR 20 to a particular $NO_x$ reduction mechanism or mechanisms, nor preclude the operation of other mechanisms. SCR 20 can be configured to perform any one of the above $NO_x$ reduction reactions, combinations of the above $NO_x$ reduction reactions, and other $NO_x$ reduction reactions.

As shown in FIG. 1, SCR 20 includes a catalytic composition (CC) 22 packaged in a shell or canister generally defining an upstream side 20' (i.e., inlet) and a downstream side 20" (i.e., outlet) and disposed in fluid communication with exhaust gas conduit 9 and optionally other exhaust treatment devices (e.g., OC 10). The shell or canister can comprise a substantially inert material, relative to the exhaust gas constituents, such as stainless steel. SCR 20 is configured to receive exhaust gas 8 and reductant 36 at upstream side 20'. CC 22 can be a porous and high surface area material which can operate efficiently to convert $NO_x$ constituents in the exhaust gas 8 in the presence of a reductant 36, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable CCs 22 can have high thermal structural stability, particularly when used in tandem with particulate filter (PF) devices or when incorporated into selective catalytic reduction filter devices (SCRF), which are regenerated via high temperature exhaust soot burning techniques. CC 22 can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

SCR 20 can have a light-off temperature above which CC 22 exhibits desired or suitable catalytic activity or yield (e.g., reduction of NOx species). The light-off temperature can be dependent upon the type of catalytic materials of which CC 22 is comprised, and the amount of catalytic materials present in SCR 20, among other factors. For example, a CC 22 comprising $V_2O_5$ can have a light off temperature of about 300° C. In another example, a CC 22 comprising Fe-impregnated zeolite can have a light off temperature of about 350° C. In another example, a CC 22 comprising Cu-impregnated zeolite can have a light off temperature of about 150° C. When SCR 20 operates at a temperature below its light-off temperature, undesired $NO_x$ breakthrough and $NH_3$ slip can occur wherein $NO_x$ and/or $NH_3$ pass through SCR 20 unreacted or unstored. $NO_x$ breakthrough and $NH_3$ slip can be particularly problematic immediately after engine startup and in cold conditions. $NO_x$ breakthrough can also be exacerbated by lean burn strategies commonly implemented in diesel engines, for example. Lean burn strategies coordinate combustion at higher than stoichiometric air to fuel mass ratios to improve fuel economy, and produce hot exhaust with a relatively high content of O2 and $NO_x$ species. The high O2 content can further inhibit or prevent the reduction of $NO_x$ species in some scenarios.

CC 22 can be disposed on a substrate body, such as a metal or ceramic brick, plate, or monolithic honeycomb structure. CC 22 can be deposited on the substrate body as a washcoat, for example. A monolithic honeycomb structure can include several hundred to several thousand parallel flow-through cells per square inch, although other configurations are suitable. Each of the flow-through cells can be defined by a wall surface on which CC 22 can be washcoated. The substrate body can be formed from a material capable of withstanding the temperatures and chemical environment associated with the exhaust gas 8. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can comprise, be contiguous with, or be proximate heater 40, as will be described below. One example of an exhaust gas treatment device is a SCRF which provide the catalytic aspects of SCRs in addition to particulate filtering capabilities. Generally, an SCRF comprises CC 22 applied to a filter substrate, such as a ceramic or SiC wall flow monolith filter, wound or packed fiber filters, open cell foams, sintered metal fibers, etc. In some embodiments, the SCRF filter substrate can comprise, be contiguous with, or be proximate heater 40, as will be described below.

The SCR 20 can store (i.e., absorb, and/or adsorb) reductant 36 for interaction with exhaust gas 8. For example, the reductant can be stored within the SCR as ammonia. During operation of SCR 20, injected reductant 36 can be stored in SCR 20 and subsequently consumed during reduction reactions with NOx species. Decomposition and storage of reductant 36 is increasingly effective as reductant droplet size within conduit 9 decreases. Reductant 36 can be supplied from a reductant reservoir (not shown) and injected into the exhaust gas conduit 9 at a location upstream from SCR 20 via an injector 30, or other suitable delivery means. Reductant 36 can be in the form of a gas, a liquid, or an aqueous solution, such as an aqueous urea solution. Reductant 36 can be mixed with air in the injector 30 to aid in the dispersion of the injected spray. A first mixer 38 can be disposed within the exhaust conduit 9 upstream from SCR 20 to further assist in thorough mixing of reductant 36 with the exhaust gas 8 and/or even distribution throughout the SCR 20, and particularly throughout CC 22. First mixer can be disposed downstream from injector 30, or upstream from injector 30. First mixer 38 can be used in combination a second mixer 39 disposed within the exhaust conduit 9 downstream from injector 30 and first mixer 38, and upstream from SCR 20. First mixer 38 and second mixer 39 (hereafter "mixers 38,39") can generally comprise a fixed or movable body configured to mix, vaporize, and/or otherwise contact reductant 36 within conduit 9. The mixers 38,39 can comprise a metal or electrically conductive material, for example. The mixers 38,39 can be partial mixers, as will be described below. Throughout this disclosure, the mixers 38,39 will be described in relation to SCR 20 for facilitating dispersion of reductant 36 within conduit 9 upstream from SCR 20. However, the mixers 38,39 are generally applicable for the dispersion of any liquids within conduit 9. For example, mixers 38,39 can be utilized to disperse liquid HC within conduit 9 upstream from an oxidation catalyst device (OC). In such an embodiment, reductant injector 30 can comprise a fuel injector disposed upstream from an OC. Moreover, in other embodiments, reductant injector 30 can comprise a liquid injector, and SCR 20 is to be considered optional and may comprise any exhaust gas treatment device or other device capable of receiving liquid via conduit 9.

Figure 2:
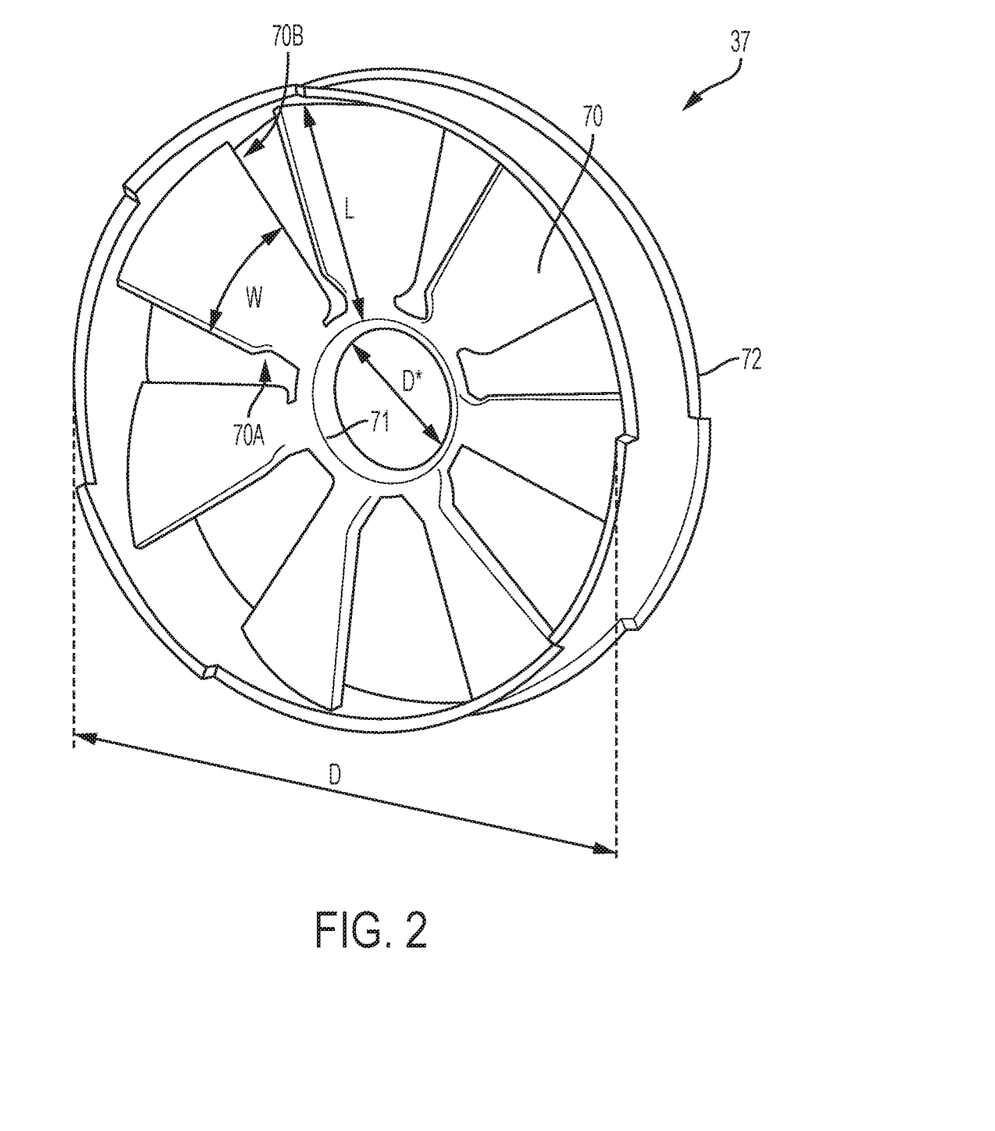
FIG. 2 illustrates a fluid mixer, according to one or more embodiments.

FIG. 2 illustrates a mixer 37, which can be representative of mixers 38,39, for example. Mixer 37 comprises a plurality of blades 70 which extend outward from a center region. When disposed within a conduit, such as conduit 9, the center region of mixer 37 corresponds to the center region of the conduit. Mixer 37 can further comprise a central retainer 71, which can be defined by a diameter D*. Central retainer 71 provides a point of attachment for a proximal end 70A of each of the plurality of blades 70, and also defines a central axial flow region within conduit 9 that allows for increased fluid flow through mixer 37. Central retainer 71 need not be limited to a circular shape, and may take any suitable shape that accomplishes the desired objectives of blade 70 attachment and fluid flow. Mixer 37 generally defines a plane which can be defined by a diameter D, and is illustrated as comprising a circular periphery, however, mixer 37 may comprise various peripheral shapes, including spheres and squares, for example. In most suitable embodiments, the peripheral shape and diameter D of mixer 37 will generally correspond to the inner diameter and cross-sectional shape of conduit 9. Further, when disposed within conduit 9, the plane defined by diameter D of the mixer 37 will be generally parallel or planar with the cross-sectional area of the conduit 9, at the particular location. The geometric extent of mixer 37 can be defined by a distal end 70B of each of the blades 70, or by an optional outer band 72. The distal ends 70B of each of the blades 70, or optional outer band 72, can be disposed proximate the conduit outer periphery 9* (shown in FIG. 4). Outer band 72 can serve as a point of attachment and structural support for the distal ends 70B of blades 70, and further assist in securing mixer 37 within a conduit, such as conduit 9. Outer band 72 can optionally include an expansion joint, to accommodate for road stress, when mixer 37 is utilized in a vehicular application, and thermal expansion, for example. Outer band 72 can be welded to conduit 9, for example, or maintained in a position by other suitable means.

When mixer 37 is positioned within a conduit, each of the plurality of blades 70 at least partially obstruct fluid flow within conduit 9. Blades 70 can be angled relative to a cross sectional plane of the conduit such that fluid flow is permitted between one or more adjacent blades 70. A width W of a blade 70 can vary relative to a length L of the blade 70, and the width W of the blade 70 generally increases from the proximal end 70A to the distal end 70B. The width W of a blade 70 can be defined as an angular length in degrees, wherein a 360 degree angular length would correspond to a blade 70 which would completely obstruct fluid flow through the mixer 37 plane defined by diameter D (e.g., a circular disc for a mixer with a circular periphery). The angular length width W of a blade 70 need not be constant across the entire length L of blade 70, and therefore generally represents an average width. A blade 70 can have an angular width W of about 35 degrees to 55 degrees. In some embodiments, the angular width W of a blade 70 can be up to about 360/(number of blades 70); in other words, the total combined surface area of blades 70 will not exceed the cross sectional area of conduit 9. In such an embodiment, the cross sectional area of conduit 9 can be determined at the position of mixer 37.

Blades 70 can be angled relative to the cross-sectional plane of conduit 9. Blades 70 can be angled about 15 degrees to about 35 degrees, or about 20 degrees to about 30 degrees relative to the cross sectional plane of conduit 9. In one embodiment, blades 70 can be angled about 25 degrees relative to the cross sectional plane of conduit 9. An angled blade 70 will have a perceived width, when viewed normal to the cross sectional plane of conduit 9, which is less than the actual width W. Similarly, a non-angled blade 70 (i.e., a blade 70 planar with the cross section plane of conduit 9) will have a perceived width equal to the actual width W. For example, a blade 70 having a width W of 51.4 degrees and angled 25 degrees relative to the cross sectional plane of conduit 9 will have a perceived width of about 46.6 degrees.

System 100 advantageously utilizes two mixers, 38 and 39, which are reduced resistance variants of mixer 37, to defeat the mixing-pressure drop trade off and provide enhanced liquid dispersion within conduit 9 and reduce pressure drop across system 100. Although two mixers are shown, it is practicable to utilize more than two reduced-resistance mixers. Reducing reductant 36 droplet diameter critical to the conversion of urea into $NH_3$, and ultimately reduction of NOx within SCR 20. Similarly, reducing the droplet size of HC can advantageously encourage oxidation of the same within an OC. Mixers 38,39 synergistically effect liquid breakup (i.e., reduce droplet size) and induce turbulent flow within conduit 9 via the low resistance zones formed by the free-flow planes described below. Such effects enhance the performance of SCR 20 and exhibit lower system pressure drops relative to single mixers 37. Reductant 36 deposition within conduit 9 is also reduced or eliminated.

Figure 3:
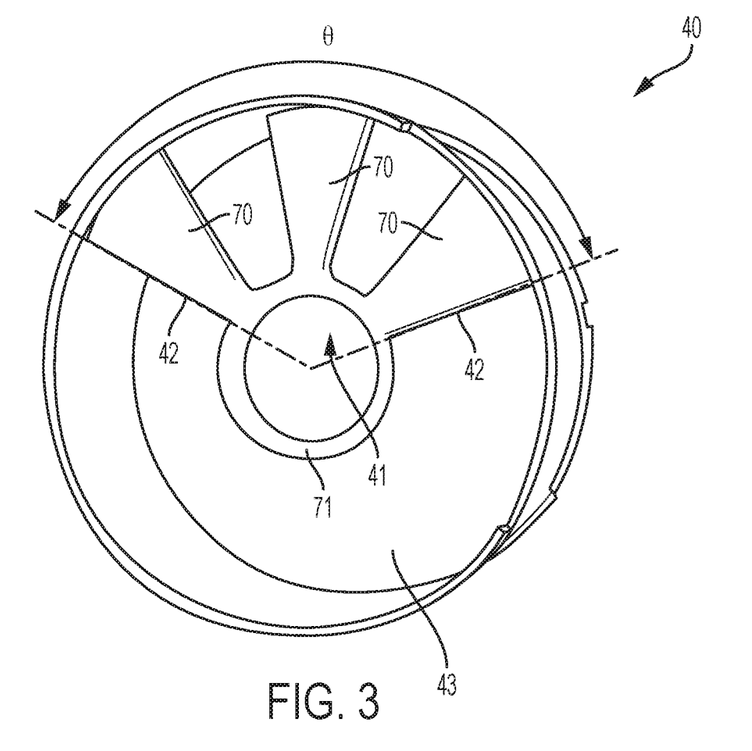
FIG. 3 illustrates a reduced-resistance fluid mixer, according to one or more embodiments.

FIG. 3 illustrates a reduced resistance variant mixer 40 including a plurality of blades 70 (e.g., 3 blades 70). Mixer 40 can comprise 2 to 10 blades, for example. Mixer 40 comprises a turbulence plane 41 in which all blades 70 occur, and is defined by the two outer-most blade 70 edges 42. Turbulence plane 41 can be defined by an angle θ, which is similarly measured between the two outer-most blade 70 edges 42. The combined perceived angular width of all blades 70 can be less than the turbulence plane 41 angle θ. The combined actual angular width of all blades 70 can be less than or greater than the turbulence plane 41 angle θ. Mixer 40 further comprises a free-flow plane 43, which is complementary to turbulence plane 41, and is a plane in which no blades 70 occur. Generally, turbulence plane 41 and free-flow plane 43 comprise combined angular magnitudes of about 360 degrees. Reduced resistance variants of mixer 37 can be defined by the presence of a free-flow plane 43 which is at least about 50 degrees, and particularly at least about 100 degrees.

Figure 4:
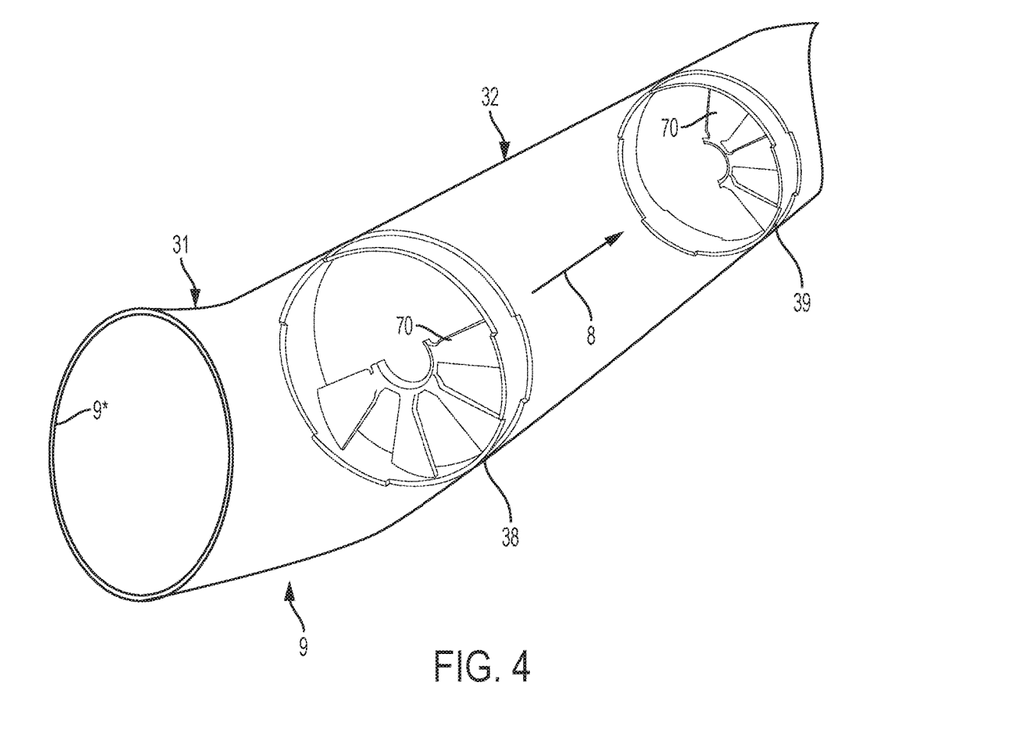
FIG. 4 illustrates a fluid mixing system, according to one or more embodiments.

In some embodiments, the average actual angular width of a blade 70 can be up to about (turbulence plane angle)/(number of blades 70); in other words, the total combined surface area of blades 70 will not exceed the cross sectional area of the turbulence plane. As shown, central retainer 71 can be radially complete. In other embodiments, as shown below in FIG. 4, central retainer 71 can be radially incomplete, and, for example, may generally correspond to the structural needs of blades 70. For example, as shown in FIG. 4, central retainer 71 may terminate proximate the two outer-most blade edges 42. Similarly, optional outer band 72 can be radially complete. In other embodiments, optional outer band 72 can be radially incomplete, and, for example, may generally correspond to the structural needs of blades 70. For example, optional outer band 72 may terminate proximate the two outer-most blade edges 42.

FIG. 4 illustrates a conduit 9 in which the mixers 38,39 are disposed. Mixers 38,39 cooperate to disperse fluid (e.g., reductant 36) injected by injector 30 within the conduit 9. As shown, mixers 38 and 39 each comprise reduced resistance variant mixers. Injector 30 can be positioned upstream from mixer 38 at upstream position 31, or between mixers 38 and 39 at downstream position 32. The position of injector 30 is defined by the location at which injector 30 injects a fluid (e.g., reductant 36) into conduit 9. In some embodiments, conduit 9 can comprise a bend (not shown) between mixers 38 and 39. To enhance liquid (e.g., reductant 36) breakup and increase turbulence within conduit 9, the turbulence planes of mixers 38,39 can overlap relative to the general flow path of conduit 9. Mixers 38,39 can be static, and thus reduce manufacturing costs and likelihood of performance defects. Further, mixers 38,39 can be derived from a single mixer (e.g., mixer 37).

Mixer 38 can comprise more blades 70 than mixer 39. In one embodiment, mixer 38 comprises 3 to 5 blades 70, and mixer 39 comprises 2 to 4 blades 70. In a specific embodiment, mixer 38 comprises 3 to 5 blades 70, mixer 39 comprises 2 to 4 blades 70, and mixer 38 comprises more blades 70 than mixer 39. Additionally or alternatively, mixer 38 can comprise a larger turbulence plane 41 angle θ than mixer 39. In one embodiment, mixer 38 comprises a turbulence plane 41 angle θ of about 95 degrees to about 275 degrees and mixer 39 comprises a turbulence plane 41 angle θ of about 60 degrees to about 220 degrees. In a specific embodiment, mixer 38 comprises a turbulence plane 41 angle θ of about 95 degrees to about 275 degrees, mixer 39 comprises a turbulence plane 41 angle θ of about 60 degrees to about 220 degrees, and mixer 38 comprises a larger turbulence plane 41 angle θ than mixer 39. Similarly, mixer 38 comprises a free-flow plane 43 angle of about 265 degrees to about 85 degrees and mixer 39 comprises a free-flow plane 43 angle of about 300 degrees to about 140 degrees. In a specific embodiment, mixer 38 comprises a free-flow plane 43 angle of at least about 85 degrees, and mixer 39 comprises a free-flow plane 43 angle of at least about 140 degrees.

Additionally or alternatively, the combined perceived average width of all blades 70 of mixer 39 can be less than the combined perceived average width of all blades 70 of mixer 38. In one embodiment, the combined perceived average angular width of all blades 70 of mixer 38 is at most 265 degrees, and the combined perceived average angular width of all blades 70 of mixer 39 is at most 215 degrees. In one embodiment, the combined perceived average angular width of all blades 70 of mixer 38 is about 85 degrees to about 265 degrees, and the combined perceived average angular width of all blades 70 of mixer 39 is about 55 degrees to about 215 degrees. In a specific embodiment, the combined perceived average angular width of all blades 70 of mixer 38 is about 85 degrees to about 265 degrees, the combined perceived average angular width of all blades 70 of mixer 39 is about 55 degrees to about 215 degrees, and the combined perceived average width of all blades 70 of mixer 39 is less than the combined perceived average width of all blades 70 of mixer 38.

In a specific embodiment, mixer 38 comprises 4 blades and mixer 39 comprises 3 blades. The combined perceived average angular width of all blades 70 of mixer 38 can be about 110 degrees to about 215 degrees, and the combined perceived average angular width of all blades 70 of mixer 39 can be about 85 degrees to about 160 degrees. Mixer 38 can comprise a turbulence plane 41 angle θ of about 130 degrees to about 220 degrees and mixer 39 can comprise a turbulence plane 41 angle θ of about 95 degrees to about 165 degrees.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An exhaust gas treatment system comprising:
   an ICE configured to communicate exhaust gas to a selective catalytic reduction device (SCR) via a conduit defined by an outer periphery;
   a reductant injector configured to communicate reductant into the conduit upstream from the SCR;
   a first mixer disposed within the conduit upstream from the reductant injector, wherein the first mixer comprises a plurality of first blades extending between a center region of the conduit to the conduit periphery, wherein each of the first blades at least partially obstructs fluid flow through the conduit and are angled relative to a cross sectional plane of the conduit such that fluid flow is permitted between adjacent first blades, and the plurality of first blades form a first turbulence plane defined by a first plane angle measured from the two outermost first blades of the first turbulence plane; and
   a second mixer disposed within the conduit downstream from the reductant injector and upstream from the SCR, wherein the second mixer comprises a plurality of second blades extending between a center region of the conduit to the conduit periphery, wherein each of the second blades at least partially obstructs fluid flow through the conduit but are angled relative to a cross sectional plane of the conduit such that fluid flow is permitted between adjacent second blades, and the plurality of second blades form a second turbulence plane defined by a second plane angle measured from the two outermost second blades of the second turbulence plane;
   wherein the first plane angle and the second plane angle are not collectively greater than 360 degrees.

2. The exhaust gas treatment system of claim 1, wherein the first turbulence plane and the second turbulence plane at least partially overlap.

3. The exhaust gas treatment system of claim 1, wherein the first blades are angled about 15 degrees to about 35 degrees relative to the cross sectional plane of the conduit, and the second blades are angled about 15 degrees to about 35 degrees relative to the cross sectional plane of the conduit.

4. The exhaust gas treatment system of claim 1, wherein the conduit comprises a bend between the first mixer and the second mixer.

5. The exhaust gas treatment system of claim 1, wherein the first turbulence plane angle is larger than the second turbulence plane angle.

6. The exhaust gas treatment system of claim 1, wherein the first turbulence plane angle is about 95 degrees to about 275 degrees, and the second turbulence plane angle is about 60 degrees to about 220 degrees.

7. An exhaust gas treatment system comprising:
   a liquid injector configured to communicate a liquid into a conduit, wherein the conduit is defined by an outer periphery and configured to transport exhaust gas therein;
   a downstream mixer disposed within the conduit downstream from the liquid injector, comprising a plurality of downstream blades extending between a center region of the conduit to the conduit periphery, wherein each of the downstream blades comprises an average angular width and are disposed such that a combined perceived average angular width of all downstream blades relative to the cross-sectional plane of the conduit is at most 215 degrees; and
   an upstream mixer disposed within the conduit upstream from the downstream mixer, and optionally upstream from the liquid injector, comprising a plurality of upstream blades extending between a center region of the conduit to the conduit periphery, wherein each of the upstream blades comprises an average angular width and are disposed such that a combined perceived average angular width of all upstream blades relative to the cross-sectional plane of the conduit is at most 265 degrees;
   wherein the upstream mixer and downstream mixer cooperate to disperse liquid injected by the liquid injector within the conduit.

8. The exhaust gas treatment system of claim 7, wherein the downstream mixer comprises a downstream free-flow plane angle of at least 140 degrees, and the upstream mixer comprises an upstream free-flow plane angle of at least 85 degrees.

9. The exhaust gas treatment system of claim 7, wherein one or more of the downstream blades and/or one or more of the upstream blades are angled relative to the cross sectional plane of the conduit.

10. The exhaust gas treatment system of claim 7, wherein the liquid injector comprises a reductant injector configured to communicate reductant to the conduit, and the reductant injector is disposed upstream from a selective catalytic reduction device.

11. The exhaust gas treatment system of claim 7, wherein the liquid injector comprises a fuel injector configured to communicate fuel to the conduit, and the fuel injector is disposed upstream from an oxidation catalyst device.

12. The exhaust gas treatment system of claim 7, wherein the combined perceived average angular width of all downstream blades is less than the combined perceived average angular width of all upstream blades.

13. The exhaust gas treatment system of claim 7, wherein the combined perceived average angular width of all downstream blades is about 55 degrees to about 215 degrees, and the combined perceived average angular width of all upstream blades is about 85 degrees to about 265 degrees.

14. An exhaust gas treatment system comprising:
an ICE configured to communicate exhaust gas to a selective catalytic reduction device (SCR) via a conduit defined by an outer periphery;
a reductant injector configured to communicate reductant into the conduit upstream from the SCR;
a first mixer disposed within the conduit upstream from the SCR, the first mixer comprising three to five first blades extending from a proximal end proximate a center region of the conduit to the conduit periphery, wherein each of the first blades at least partially obstructs fluid flow through the conduit and are angled relative to a cross sectional plane of the conduit such that fluid flow is permitted between adjacent first blades; and
a second mixer disposed within the conduit downstream from the first mixer and upstream from the SCR, the second mixer comprising two to four second blades extending from a proximal end proximate a center region of the conduit to the conduit periphery, wherein each of the second blades at least partially obstructs fluid flow through the conduit and are angled relative to a cross sectional plane of the conduit such that fluid flow is permitted between adjacent second blades;
wherein the first mixer comprises a first free-flow plane angle of at least 85 degrees, and the second mixer comprises an second free-flow plane angle of at least 140 degrees.

15. The exhaust gas treatment system of claim 14, wherein the first blades are angled about 15 degrees to about 35 degrees relative to the cross sectional plane of the conduit, and the second blades are angled about 15 degrees to about 35 degrees relative to the cross sectional plane of the conduit.

16. The exhaust gas treatment system of claim 14, wherein the first mixer further comprises a central retainer attached to the proximate ends of the first blades and defining an axial flow region through the first mixer, and/or the second mixer further comprise a central retainer attached to the proximate ends of the second blades and defining an axial flow region through the second mixer.

17. The exhaust gas treatment system of claim 14, wherein the first mixer and second mixer are static.

18. The exhaust gas treatment system of claim 14, wherein the second free-flow plane is larger than the first free-flow plane.

19. The exhaust gas treatment system of claim 14, wherein each of the first blades and second blades comprise a surface area, and the total surface area of the plurality of first blades and the plurality of second blades is less than or equal to the cross sectional area of the conduit.

20. The exhaust gas treatment system of claim 14, wherein the first blades and the second blades are derived from a single complete mixer.

* * * * *